April 25, 1933.  G. A. LUTZ  1,905,479
METHOD OF ELECTRIC WELDING
Filed Feb. 12, 1931    2 Sheets-Sheet 1
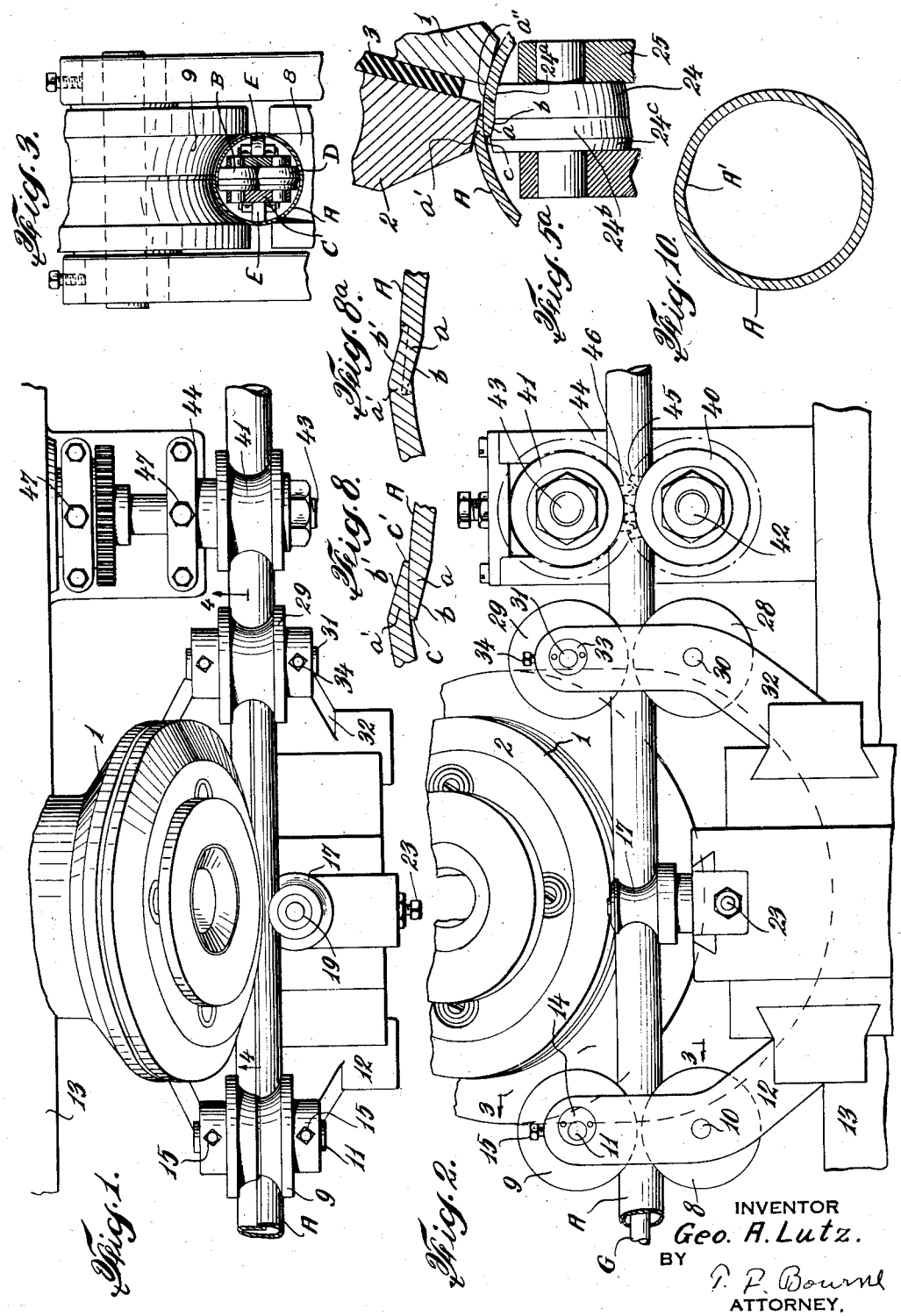
INVENTOR
Geo. A. Lutz.
BY
P. P. Bourne
ATTORNEY.

April 25, 1933.  G. A. LUTZ  1,905,479
METHOD OF ELECTRIC WELDING
Filed Feb. 12, 1931   2 Sheets-Sheet 2
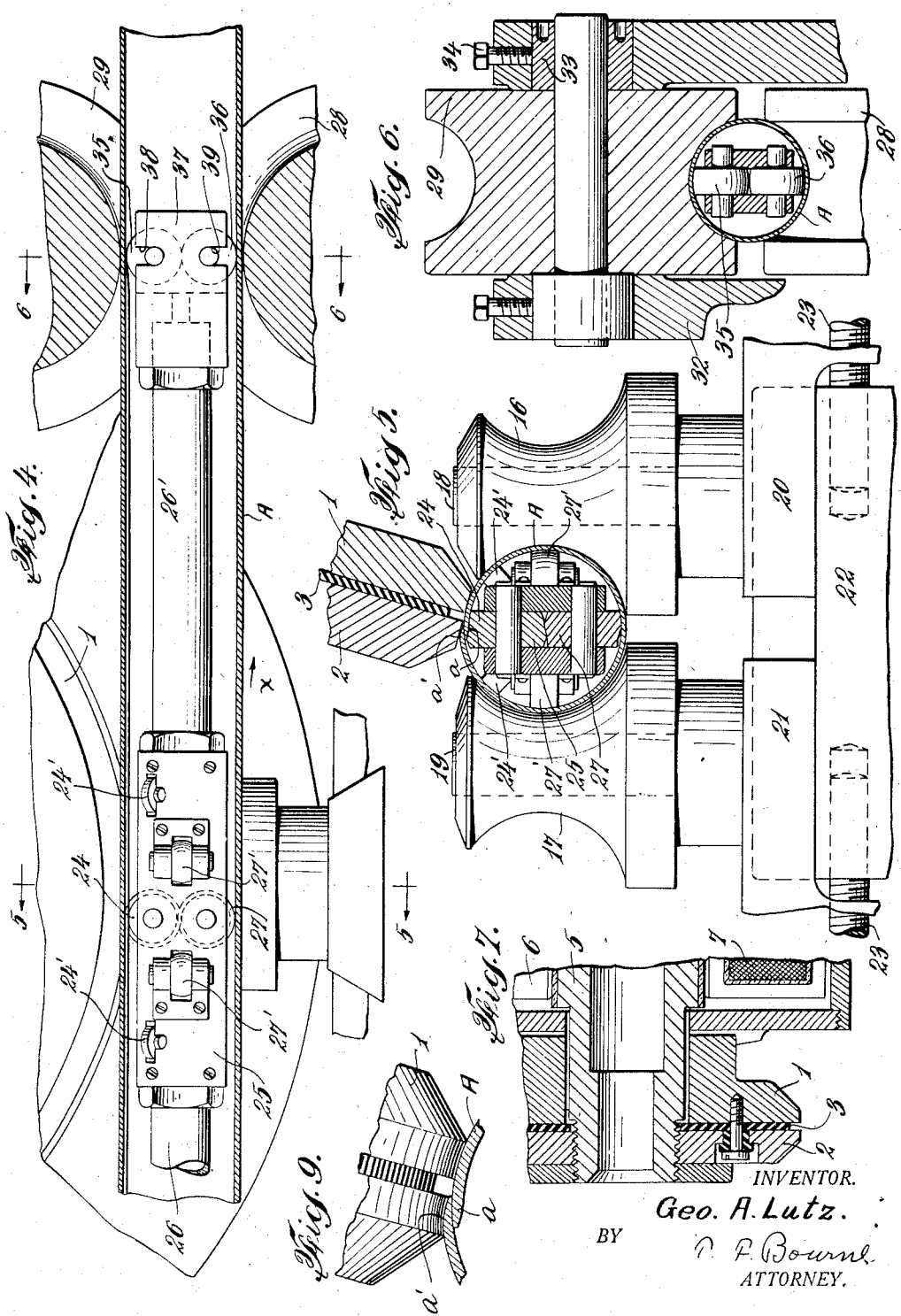
INVENTOR.
Geo. A. Lutz.
BY
ATTORNEY.

Patented Apr. 25, 1933

1,905,479

UNITED STATES PATENT OFFICE

GEORGE A. LUTZ, OF CRANFORD, NEW JERSEY, ASSIGNOR TO AMERICAN CIRCULAR LOOM COMPANY, INC., OF DOVER, DELAWARE, A CORPORATION OF DELAWARE

METHOD OF ELECTRIC WELDING

Application filed February 12, 1931. Serial No. 515,229.

An object of my invention is to weld together the overlapped marginal portions of metal stock, and particularly the over-lapped portions of a tubular metal blank, in such a way that the lapped portions will be compressed one into the other to a desired thickness, while being heated, with minimum cost.

My invention may be carried out by forming the surface of diagonally opposite marginal portions of the stock, as where a tube or pipe is to be made, on a radius or inclined, so that an inclined portion will be exterior where the marginal portions of the stock are lapped, the lapped portions are heated to a welding temperature and compressed to force the lapped portions one into the other to an extent desired. The compressing together of the lapped portions may be such as to produce a thickness in the lap the same, or substantially the same, as the gage of the metal blank.

In the accompanying drawings I have illustrated means adapted to carrying out my invention, wherein, Fig. 1 is a plan view of an electric welding machine adapted to carry out my invention.

Fig. 2 is a side elevation of Figure 1.

Fig. 3 is a cross-section on line 3, 3, in Figure 2;

Fig. 4 is an enlarged section on line 4, 4 in Fig. 1;

Fig. 5 is a cross-section on line 5, 5 in Fig. 4;

Fig. 5a is an enlarged detail of Fig. 5;

Fig. 6 is a cross-section on line 6, 6 in Fig. 4;

Fig. 7 is a detail view of a portion of the transformer and electrodes;

Fig. 8 is a sectional detail of part of Fig. 5a;

Fig. 8a diagrammatically illustrates the welding;

Fig. 9 is a detail view, illustrating a modification; and

Fig. 10 is a sectional detail of a tube welded according to my invention.

Similar numerals indicate corresponding parts in the several views.

A piece of metal stock or skelp, which may be rolled sheet metal, is indicated at A. As illustrated in the drawings the metal A is in tubular form having its marginal edge portions $a$ and $a'$ lapped for welding together, (Figs. 5 and 5a). The stock or skelp may be rolled or drawn into tubular form with its marginal portions lapping in any known or desired way. The diagonally opposite marginal portions of the stock or skelp A are formed on a radius or inclined from one surface toward the adjacent edge, for a desired distance, to gradually reduce the marginal portions at $b$ and $b'$ toward the adjacent edge $c$ and $c'$, as indicated in Fig. 8. The edge portions $c$ and $c'$ are of a desired thickness so that one of said edge portions will sink into the opposing metal of the lapped portions to the desired extent. By preference the inclinations $b$ and $b'$ of the marginal portions of the stock or skelp are of such a length, from the corresponding edge $c$ or $c'$ to the surface of the metal A adjacent, and the lapping of the marginal portions $a$ and $a'$ is such, that the thickness of the lapped portions will be substantially equal at all points in a radial direction, so that the portions $a$ and $a'$ may be sunk or pressed one into another to provide a substantially equal thickness of the weld at all parts of the lap, after welding the overlapped portions together. The inclined surfaces $b$ and $b'$ may be relatively flat, and the peripheries of the electrodes may also be flat, as indicated in Figs. 5 and 5a, or said surfaces and the peripheries of the electrodes may be curved, as in Fig. 9.

The inclined surfaces at $b$ and $b'$ may be formed in any desired way, such as in a mill, after which the stock A may be rolled or formed to the desired shape, such as tubular, with an inclined portion such as $b'$, exposed outwardly, and the other inclined portion, such as $b$, extending inwardly, (Figs. 3 and 5). The stock A may be rolled or bent into tubular form with its portions $a$ and $a'$ overlapped, as by traversing the stock through a suitable pass between grooved rollers in a known way, or such as set forth in my application filed April 23, 1930, Serial No. 446,463.

The overlapped marginal portions $a$, $a'$ may be heated for welding in any desired way. I have illustrated spaced electrodes 1 and 2, which may be insulated by insulation at 3. The electrodes illustrated are of the rotary variety united for uniform rotation, as by screws 4 connecting said parts and insulated, such as illustrated in Fig. 7. The electrodes are illustrated as connected with the sides of secondary 5 of a rotary transformer 6 having a primary 7. The transformer referred to may be of any well known type, such as set forth in Letters Patent No. 1,478,262, issued December 18, 1923, to Snodgrass and Hunter. The electrodes and transformer illustrated will rotate on a common axis. At 8 and 9 are grooved guiding rollers providing a pass between them for the tubular blank having the overlapped marginal portions $a$ and $a'$, as indicated in Fig. 3. Said rollers have shafts 10 and 11 journaled on support 12 carried by main frame 13 of the apparatus. The pressure of the rollers upon the tubular blank A may be adjusted by means of eccentric bearings at 14, adjustable by screws 15 in a known way, or as set forth in my aforesaid application. Adjacent to the electrodes is shown means for guiding the tubular blank as it travels in the direction of the arrow $x$ in Fig. 4. I have illustrated spaced grooved rollers at 16 and 17 shown mounted on pivots 18 and 19, carried by blocks 20 and 21, on a support 22 of the main frame. Said rollers may be adjusted transversely with reference to the blank A by suitable means, such as by screws 23. Within the tubular metal blank is a roller 24, opposed to the electrode 2. Between said roller and the electrode the adjacent portions of the blank travel, with the electrodes in contact with the blank adjacent to the lapped marginal portions $a$ and $a'$, as indicated in Figs. 5 and 5a. The roller 24 is shown journaled in a frame 25 within the tubular blank, which frame may be retained by means of an arm or tube 26 supported in any desired or known way. At 27 is a roller opposed to the roller 24 and journaled upon the frame 25, the roller 27 being adapted to engage the inner surface of the tubular blank at its bottom portion, whereby the rollers 24 and 27 resist the pressure of the electrodes against the blank. The roller 24 has a surface at 24$a$ shaped to fit the inner normal surface $a''$ of the blank A and a surface 24$b$ shaped to fit the inclined surface $b$ of the blank, which surfaces will tend to guide the inner lap $a$ of the blank with respect to the electrodes, (Fig. 5$a$). The annular portion 24$c$ of roller 24 is of such diameter as not to interfere with the edge $c$ of the blank so that the latter may be pressed into the metal of the overlapping portion of the blank. The frame 25 is shown provided with laterally extended rollers 27' that bear against the adjacent sides of the tubular blank, whereby the frame 25 is retained from lateral movement within the blank. The frame 25 is also shown provided with angularly disposed rollers 24' which bear against the inner walls of the blank A in such a way as to guide the blank and resist lateral creeping of the overlapped portions $a$ and $a'$ of the blank with respect one to another and in guiding lapped portions of the blank. In the construction illustrated in Figs. 5 and 5$a$ the electrode 1 contacts with the inset or convolute portion $a$ of the tubular blank A and the electrode 2 contacts with the outer lapped portion $a'$ of the blank opposite to the roller 24, said roller preferably not engaging the metal of the blank opposite to the electrode 1, whereby desired pressure of the electrodes against the blank may be effected for flow of the current between the electrodes through the lapped portions. The rollers 8 and 9, by suitably compressing the overlapped portions of the tubular blank, provide a definite or fixed thickness of said lapped portions for passage between the electrode 2 and the roller 24, as in the nature of cold rolling. To create such pressure on the lapped portions $a$, $a'$ of the blank a roller B is shown located within the blank to bear against the inset portion $a$ (Fig. 3). The roller B is journaled in a frame C within the blank, and a roller D, journaled in said frame, bears against the roller B and against the bottom surface of the blank. Side rollers E journaled in said frame bear against the sides of the blank to retain the frame C from lateral movement. The frame C may be retained in position by an arm or tube G, in any desired way. The operative surfaces of electrode 2 and roller 24 are of such a width and so positioned on the inclined surfaces $b'$ and $b$ of the blank A as to cover said surfaces to assure the pressing of one lapped portion into the other to a desired extent. The two lapped portions $a$ and $a'$ may be pressed by the electrode one partially into the other while being heated, as illustrated in Fig. 10.

The welding heat created in the overlapped marginal portions of the blank by the flow of current of suitable amperage from one electrode to the other through the lapped portions will heat the latter for welding said portions. The pressure of the electrode 2 against the lapped portions $a$ and $a'$ of the blank A, when the latter are at a welding temperature, will force or squeeze said lapped portions one into the other to a desired extent depending upon the space provided between the electrode 2 and the roller 24, (Fig. 5$a$). The edges $c$ and $c'$ may be buried in the opposing metal $a'$ and $a$, respectively, whereby the thickness of the welded portion of the resulting tube or pipe may be substantially the same as the gage of the metal of the blank. The portion of the welded tube where the weld is made, as at A', may be irregular or non-circular in outline, as in Fig. 10.

When it is desired to produce the welded tube or pipe described in the form of a completely annular tube or pipe the irregularly appearing weld, such as in Fig. 10, may be compressed, ironed or hammered into a circular condition, as indicated in Fig. 6, to substantially the gage of the blank A. For the purpose stated I have illustrated compressing rollers for the welded portions of the tubular blank, whereby said portions may be compressed or ironed as the tube travels. As illustrated, I provide a throat or pass formed by the grooved rollers 28 and 29 which are shown carried by shafts 30 and 31 that are journaled on uprights 32 on the main frame. By preference the roller 29 is adjustable toward and from the roller 28, for which purpose the shaft 31 is shown eccentrically journaled in sleeves 33 rotatively supported in bearings in the upright 32 and retained in set position by screws 34, (Figs. 2 and 6). The area of the throat or pass between the rollers 28 and 29 may be substantially that of the cross sectional area of the finished welded tube and correspondingly greater than the cross-sectional area of the tubular blank that is lapped, as in Fig. 5a, hence greater than the cross-sectional area of the pass between the rollers 8 and 9. Within the welded tube I provide roller means to serve with the roller 29 in compressing, ironing or finally straightening or curving the welded portions of the tubular blank for a finished tube. At 35 is a roll to engage the inner surface of the tubular blank along the welding line in opposition to the roller 29, and a roll 36 engages the lower surface of the tubular blank in opposition to the roller 35. The distance between the diametrically opposing surfaces of the rollers 35 and 36 may be such that the welded marginal portions of the tubular blank will be squeezed so as to curve them to correspond to the curvature of the normal unwelded portions of the tube, (Fig. 6). The rolls 35 and 36 are shown retained in position and guided by a head or block 37, shown carried by an arm 26′, extending from the frame 25 and secured to the said frame and to the head 37 by nuts and threads. The block is shown provided with recesses 38 and 39 receiving pivots of the rolls 35 and 36. Water may be supplied within the tube blank for cooling purposes through the arms 26 and 26′ which may be tubular for the purpose.

Tube feeding rollers 40 and 41 are shown spaced from the rollers 28 and 29 and are suitably grooved to receive the welded tube. The rollers 40 and 41 are carried by shafts 42 and 43 journaled in upright 44 on the main frame, (Fig. 2). Said shafts are shown provided with intermeshing gears 45 and 46 for rotating said rollers in the same direction in unison. Either of the said shafts may be driven by suitable power in any desired way. Desired pressure of the grooved rollers 40 and 41 upon the welded tube may be effected as by adjusting the shaft 43 vertically by means of screws 47, (Figs. 1 and 2).

The diagonally disposed or inclined margins $b$, $b'$ of the continuous metal strip or sheet A, of any desired width and gage, are first formed to a desired inclined shape, and said strip or sheet is rolled or formed into a tubular blank with the marginal portions $a$ and $a'$ overlapped to the desired extent, with an inclined edge surface $c'$ exposed outwardly. While said portions are in such condition, preferably being first compressed together to a definite thickness, they are heated to a welding temperature under suitable pressure at the lap, to cause said portions to become pressed one partially into the other by electrode 2 and be welded together, as the blank travels longitudinally. Since the marginal portions $b$ and $b'$ extend in a direction from one surface of the metal toward the edge the whole of the inclined portions will be heated to a desired extent so that when the welded tube passes from the heating place the whole extent of the overlapped portions of the tube will be welded together. When it is desired that the tube have a relatively smooth or substantially uniform circumferential finish or appearance the welded portions are compressed or ironed down, as illustrated in Fig. 6. As the heated welded portions of the tube pass from the heating place, or the electrodes, (Fig. 10), they will remain heated while passing to the compressing means, whereupon as the tube travels between the rollers 28 and 29 the heated welded portions will be compressed or ironed down to a desired thickness, such as corresponds to the gage of the metal of the blank.

My invention is particularly applicable in the welding of so-called thick-walled tubes or pipes, such as of 3/8″ gage or over, since after such lap-welded tubes having the original gage at the lap have been welded it is difficult to reduce the lap to a smooth finish of the gage of the blank at low cost. By reducing the marginal portions $b$ and $b'$ in an inclined direction I am enabled to compress a minimum of metal thickness at the lap to produce a weld with minimum effort and cost.

This application embodies an improvement on the invention set forth in my application filed December 16, 1930, Serial No. 502,660.

Having now described my invention what I claim is:

1. The method of lap-welding consisting in forming inclined surfaces along the marginal portions of metal stock, lapping portions of said metal stock with the inclined surfaces substantially parallel to and overlapping one another, heating said inclined marginal portions to a welding temperature, and forcing said marginal portions one into another while so heated to such a thickness as substantially equals the thickness of the gage of said stock.

2. The method of lap-welding consisting in forming flat inclined surfaces on marginal portions of metal stock, lapping marginal portions of said stock, heating said lapped portions to a welding temperature, compressing said lapped portions one against another while at said temperature to provide a substantially flat welded portion of the stock and bending said flat portion into a circular condition.

3. The method of lap-welding consisting in lapping marginal portions of metal stock, causing outer and inner inclined marginal portions to overlap, traversing said stock, causing electric current to flow through said inclined lapped portions to heat them to a welding temperature, and pressing said lapped marginal portions one into the other while at said temperature during flow of the current to weld said lapped portions together to a substantially flat condition and a thickness less than the original combined thickness of said lapped portions.

4. The method of lap-welding consisting in lapping marginal portions of metal stock having inclined marginal portions, traversing said stock, causing electric current to flow through the said lapped portions to heat them to a welding temperature, pressing said lapped inclined marginal portions one into the other while at said temperature to weld said lapped portions together to a substantially flat condition and to a thickness less than the original combined thickness of said lapped portions, and forming said welded portions into a circular condition.

GEORGE A. LUTZ.